(12) United States Patent
Dev A V et al.

(10) Patent No.: US 12,399,883 B1
(45) Date of Patent: Aug. 26, 2025

(54) INTELLIGENT DATA INDEXING OF IN-MEMORY DATABASES

(71) Applicant: o9 Solutions, Inc., Dallas, TX (US)

(72) Inventors: Bharath Dev A V, Bangalore (IN); Srinath Goud Vanga, San Jose, CA (US)

(73) Assignee: o9 Solutions, Inc., Dallas, TX (US)

( * ) Notice: Subject to any disclaimer, the term of this patent is extended or adjusted under 35 U.S.C. 154(b) by 0 days.

(21) Appl. No.: 18/794,362

(22) Filed: Aug. 5, 2024

(51) Int. Cl.
*G06F 7/00* (2006.01)
*G06F 16/22* (2019.01)
*G06F 16/901* (2019.01)
*G06N 20/00* (2019.01)

(52) U.S. Cl.
CPC ........ *G06F 16/2264* (2019.01); *G06F 16/221* (2019.01); *G06F 16/9024* (2019.01); *G06N 20/00* (2019.01)

(58) Field of Classification Search
CPC .............. G06F 16/2264; G06F 16/221; G06F 16/9024; G06N 20/00
USPC .......... 707/709, 730, 741, 748, 802, 17.044, 707/17.084; 705/3, 7.29, 14.4, 14.43, 705/14.49, 14.53, 26.2, 26.63
See application file for complete search history.

(56) References Cited

U.S. PATENT DOCUMENTS

| | | | |
|---|---|---|---|
| 11,086,832 B2 * | 8/2021 | Zhou | G06F 12/00 |
| 2021/0248053 A1 * | 8/2021 | Wei | G06F 11/3404 |
| 2024/0037583 A1 * | 2/2024 | Wilson | G06N 3/088 |
| 2024/0037585 A1 * | 2/2024 | Wilson | G06Q 30/0203 |
| 2024/0232729 A1 * | 7/2024 | Bouvrie | G06N 20/00 |
| 2025/0111392 A1 * | 4/2025 | Scarr | G06Q 30/0202 |

* cited by examiner

*Primary Examiner* — Md I Uddin
(74) *Attorney, Agent, or Firm* — Schwegman Lundberg & Woessner, P.A.

(57) ABSTRACT

Systems and techniques for intelligent data management are described herein. An example technique may include receiving a set of training data from a graph cube server, training a machine learning model using the received set of training data, and determining, using the machine learning model, a data usage pattern. The example technique may include receiving an indication that a first user of a user group logged into an intelligent data management system, the indication including a first user detail of the first user, and loading a first column into memory based on the determined data usage pattern and the first user detail.

14 Claims, 8 Drawing Sheets

INTELLIGENT DATA INDEXING OF IN-MEMORY DATABASES

TECHNICAL FIELD

Examples described herein generally relate to in-memory columnar databases for data analytics and integrated business planning.

BACKGROUND

In-memory columnar databases store data in columns instead of rows. Columnar databases provide a wide spectrum of advantages that are specifically suited for analytical solutions. Whenever a particular report is loaded, related columns are loaded into memory for the first time. This lazy loading technique is to ensure that the system's memory is not overloaded with columns that are not relevant to a user.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

In the following description, for purposes of explanation, numerous specific details are set forth in order to provide a thorough understanding of some example examples. It will be evident, however, to one skilled in the art that the present invention may be practiced without these specific details.

In-memory databases are designed to store and manage data in a way that optimizes the speed of query processing and data retrieval. In-memory databases leverage the capabilities of main memory or random-access memory (RAM) to hold the entire dataset, instead of traditional disk drives, allowing for ultra-fast access and manipulation of data. In-memory databases use specialized data structures to store data in the RAM.

In-memory databases may be a column-oriented, a row-oriented, or both data storage. A row-oriented database stores the data records together in one row, whereas a column-based storage stores the data in a columnar format. Data access is managed by an intelligent database management system through data indexing.

In-memory columnar databases are ideal for use cases like Business Intelligence, Data Warehousing, Real-Time Analytics and Big Data Processing. With their ability to handle complex queries and provide rapid response times, in-memory columnar databases are an essential tool for modern data-driven enterprises.

An in-memory columnar database, referred to herein as a graph cube, can execute a data definition language (DDL)/data manipulation language (DML) commands using a proprietary structured query language (SQL)-like architecture called integrated business planning language (IBPL). The graph cube network may be maintained within a multidimensional data warehouse containing nodes and edges that describe relationships between the nodes. The various data processing actions that are implicated in this setting may include the creation and access of millions of data records that describe relationships in a graph cube network for individual items (e.g., products) and actions with such products that occur among any number of geographic locations.

The present inventors have recognized, among other things, that a problem to be solved can include when dynamically loading reports into an in-memory columnar database, a performance degradation proportional to the number and size of the columns. The systems and techniques described herein can help provide a solution to this problem, such as by delaying the data loading process until right before the data is needed for a request. The systems and techniques described herein include a complex data management system capable of precisely predicting which data should be loaded and which data should be unloaded into memory, guaranteeing seamless system operations and improved performance. The careful balance between data loading and data unloading is crucial to the optimal performance of in-memory columnar database systems.

In an example, users of a planning system interact with specific data elements based on their roles and tasks. For example, some users may participate in the forecasting process, while others may be involved in sales planning and promotional planning processes. Additionally, some users begin accessing the data slightly earlier than others due to their job nature. For example, a forecast planner starts working with forecast data a bit sooner than the forecast overrider, who comes in later to make adjustments. This allows the system to recognize that the forecast overrider may start using the forecast data right after the forecast planner starts using it, enabling the system to use this information to make the data loading and unloading process more intelligent.

In various examples, each user of the planning system belongs to a user group having a usage pattern. As user group usage patterns change, the in-memory database system can leverage these shifts to continually enhance the system for future users. In order to capture these evolving usage patterns, the system collects detailed historical data. The system organizes the collected historical data into an M×N matrix, where M represents the number of users and N represents the number of system columns. Each system column is loaded independently, ensuring a detailed memory-loading process.

In a live system, users consistently log in and out, and their usage patterns vary over time. For instance, users working on 2023 forecast data will shift their attention to the 2024 forecast data once the year ends. This dynamic nature of usage patterns means that columns are regularly added or removed, resulting in changes to the matrix entries over time.

The systems and techniques described herein include an intelligent data management system that activates when a user logs into the planning system. The intelligent data management system identifies the elements to be loaded based on a multi-step process and then loads the necessary new columns. Similarly, when a user logs out, the system identifies the columns to be removed, while keeping the columns related to the users who are still online. This smart and dynamic data loading and unloading mechanism ensures efficient memory management and improves the overall system performance.

Figure 1:
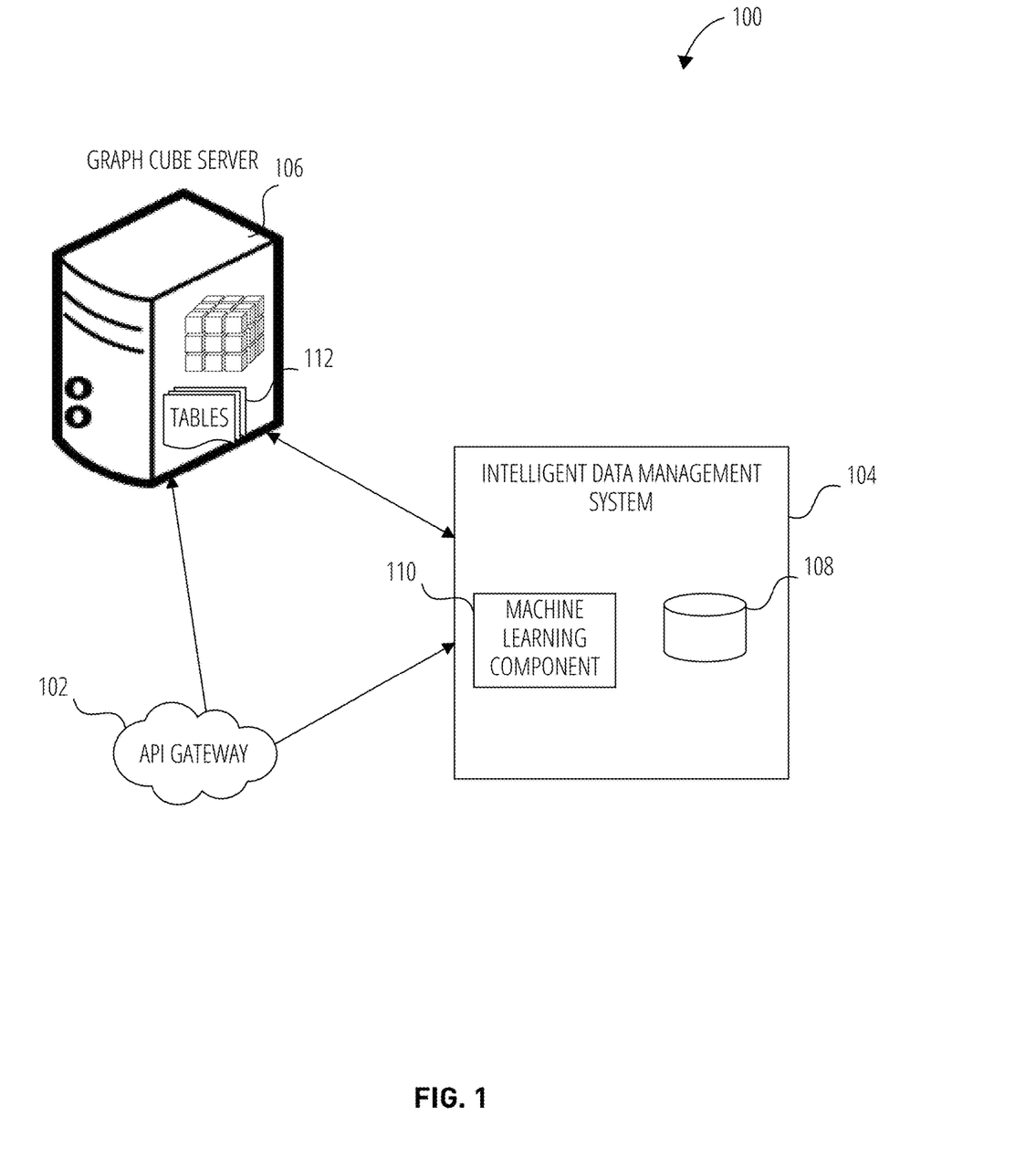
FIG. 1 illustrates an intelligent data management system, according to some examples.

FIG. 1 is a block diagram of an example of a system 100 for intelligent data indexing of an in-memory database, according to one example. The system 100 may include an application programming interface (API) Gateway 102, a graph cube server 106 (e.g., in-memory graph cube enterprise knowledge graph (EKG), or the like), and an intelligent data management system 104. The API Gateway 102, the graph cube server 106, and the intelligent data management system 104 may be communicatively coupled to each other via a wired network, a wireless network, a shared bus, or the like.

In an example, the graph cube server 106 includes a database that comprises the data processed on the system 100 (e.g., data tables, or the like).

The intelligent data management system 104 may include an in-built database 108 (e.g., an in-memory columnar database, or the like) that holds prediction data used to predict which table (or column) of the graph cube server 106 to be loaded into memory when a user logs into the system or which table (or column) to be unloaded from the memory when a user logs out.

Figure 2:
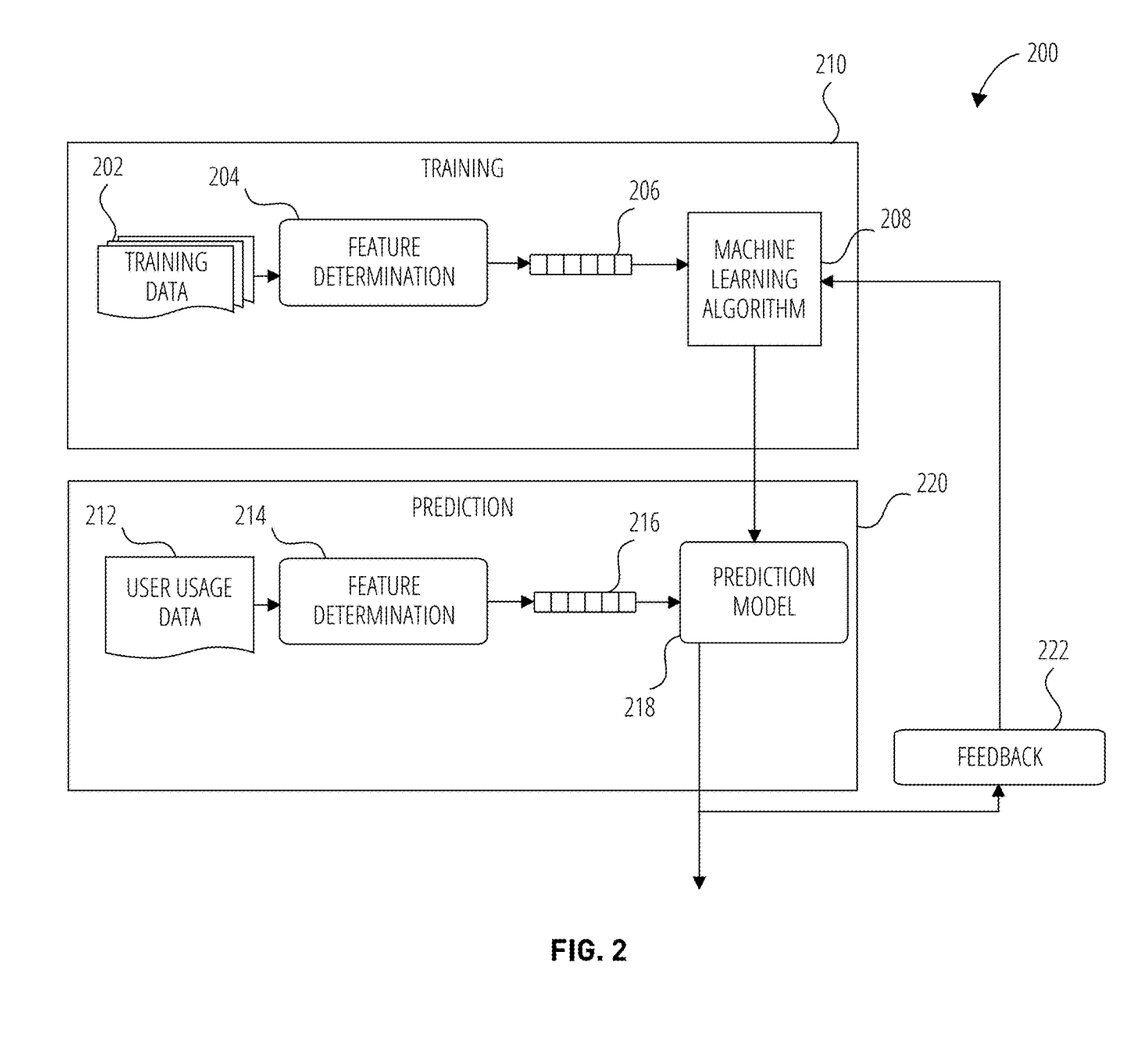
FIG. 2 illustrates an example machine learning component for an intelligent data management prediction, according to some examples.

In an example, the intelligent data management system 104 is powered by a machine-learning component, as shown in FIG. 2. The intelligent data management system 104 loads (or unloads) data from the graph cube server 106 according to predictions made by the machine learning component 110. The machine learning component 110 predicts future data usage behavior by a user (i.e., data likely to be accessed by the user) based on input data (e.g., historical data related to data access patterns, user report usage on a particular user, or the like). Over time, the data usage pattern of the user may change. The machine learning component 110 of the intelligent data management system 104 is retrained to adapt to a changing data usage pattern and optimize the prediction of future data usage.

In an example, a user has a functional area (e.g., a user role, or the like) and a predefined user group. The user may participate in a cross-collaboration project (i.e., collaboration between functional areas) having to access data from another functional area (e.g., another user role, or the like). In an example, the user participating in a cross-collaboration project may be added to all the functional areas (e.g., user groups, user roles, or the like).

A user may log in and log out of the system 100 through the API Gateway 102. In an example, a user who logs into the system has a user identification (ID) associated with them. The user may have one or more user roles (or tasks) according to the requirements of the integrated business planning (IBP). In an example, the user roles include a system architect, a data administrator, and a planner. Each user role has an access control list (ACL). The ACL includes rules that determine which subset of data may be accessed (or not). The ACL provides rules on how a user can interact with the system based on the one or more roles of the user and which tables (or columns) the user can access (i.e., which tables (or columns) can be loaded into memory).

In an example, the graph cube server 106 database is a relational database with predefined relationships between the different entities (i.e., tables 112). In an example, the database relationship schema includes a user role table, a user column interaction table, and a leading user table. The user role table includes the user ID as a primary key, the one or more user roles, and the ACL rules. The user column interaction table associates the user with the column loaded into memory. The user column interaction table includes the user ID as primary key, a user last login time field, a column loaded into memory field, and a user last logout time field. The user last login time field and the user last logout time field define a session. The session refers to a time span where a user loads, unloads, or both, a column into memory. In an example, the leading user table captures temporal access patterns and identifies a user who consistently interacts with data before another user. The leading user table offers insights into potential trends of data usage.

FIG. 2 illustrates an example machine learning component 200 for an intelligent data indexing system, according to an example. The machine learning component utilizes a training module 210, and a prediction module 220. Training module 210 feeds training data 202 into feature determination module 204 which determines one or more features 206 from this information. The training data 202 includes user roles data, user column interaction data, and detailed historical data of data usage patterns by different users. Features 206 are a subset of the information input and are information determined to be predictive of the data that needs to be loaded into memory for optimal memory usage based on usage data patterns. Examples of features 206 include a role of a user, access control rules, a user ID, a category of users, or the like. In various examples, the features 206 are determined for each user accessing the system.

The machine learning algorithm 208 produces a prediction model 218 based on the features 206 and feedback 222 associated with those features. For example, the features associated with data usage patterns by past users are used as a set of training data. As noted above, the prediction model 218 may be for the entire system (e.g., built of training data accumulated throughout the entire system, regardless of the user for which optimal usage data is being calculated) or may be built specifically for a user or a user group. In an example, the user group includes one or more users having same user role.

In the prediction module 220, the current user usage data 212 (e.g., data used by the current user logged into the system, or the like) may be input to the feature determination module 214. Feature determination module 214 may determine the same set of features or a different set of features as feature determination module 204. In some examples, feature determination module 214 and feature determination module 204 are the same module. Feature determination module 214 produces features 216, which are input into the prediction model 218.

It should be noted that the prediction model 218 may be periodically updated via additional training and/or feedback 222. The feedback 222 may be feedback from users of the intelligent data management system 104 that provides explicit feedback (e.g., responses to questions about data usage needs, or the like) or may be automated feedback based on outcomes of the optimal memory usage (e.g., data used by a user in a session, or the like).

The machine learning algorithm 208 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, and hidden Markov models. Examples of unsupervised learning algorithms include expectation-maximization algorithms, vector quantization, and information bottleneck method. In an example, a multi-class logistical regression model is used.

Figure 3:
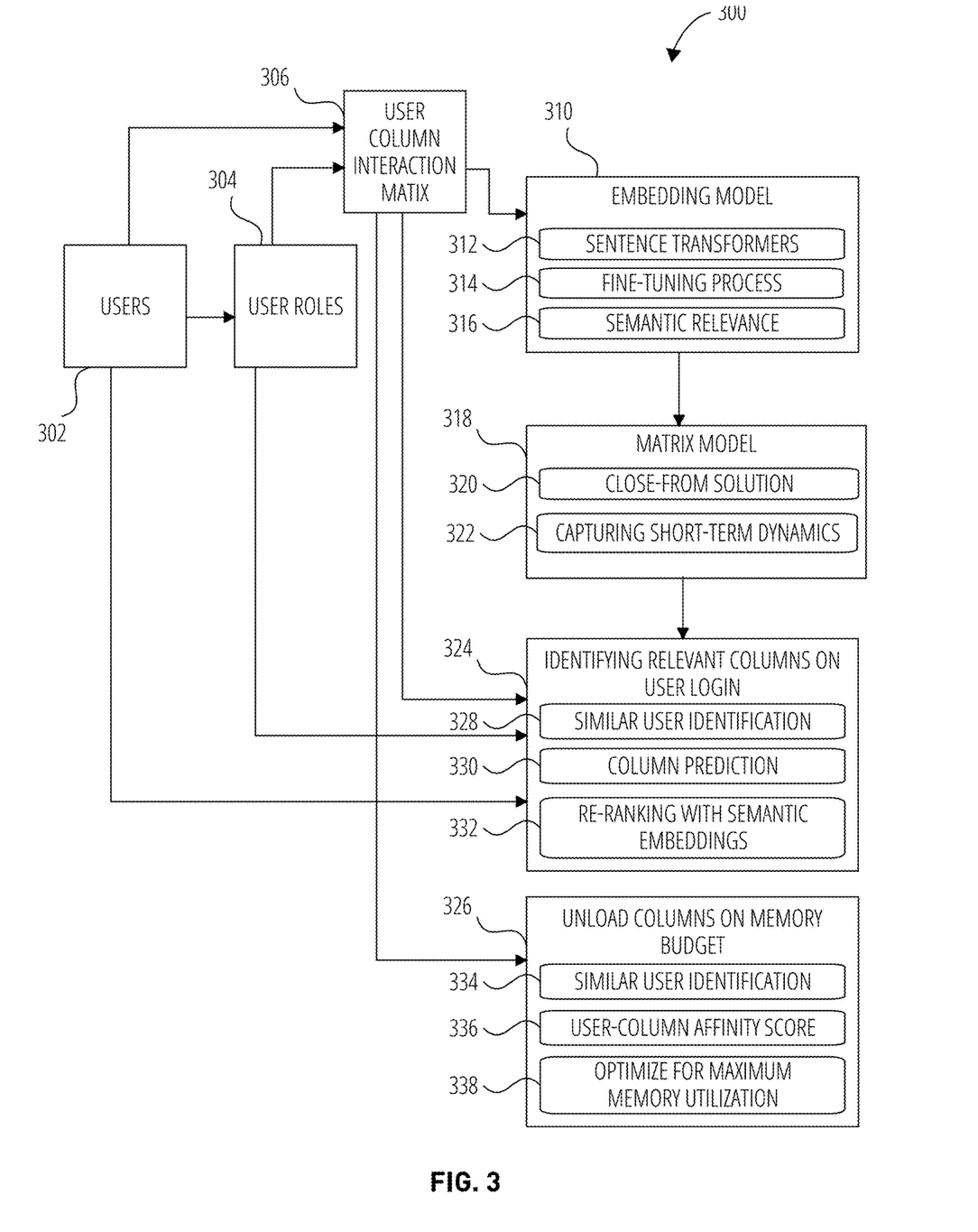
FIG. 3 illustrates a diagram of an example of a system for intelligent data management, according to some examples.

FIG. 3 illustrates an architecture diagram 300 of the intelligent data management system 104, according to an example. In various examples, the intelligent data management system 104 includes an embedding model 310, a matrix factorization for dynamic update module 318, an identifying relevant columns on user login module 324, and an unload columns on memory budget module 326.

The embedding model 310 includes a pre-trained model (e.g., sentence transformers 312, or the like) for producing embeddings for a user of the system and for a table column loaded into memory, wherein the embedding reflects the semantic relationship between the user and the table column. The pre-trained model produces the embedding by capturing the semantic meaning in text and fine-tuning it using user-column interaction data (fine-tuning process 314). Embedding are representations of real-world objects (e.g., text, image, audio, or the like) as vectors that can be processed by machine learning models. The fine-tuning process 314 adapts the pre-trained model 312 to the specific domain and data distribution of the system 100, resulting in more relevant and accurate embeddings. In an example, the table column is named to reflect the utility of the table column (e.g., a table column named forecast to reflect that the table column is related to forecasting), which makes pre-trained model embedding well-suited for the semantic relevance 316 step of capturing nuanced relationships between the user and the table column.

In various examples, the matrix model 318 includes a closed-form matrix factorization (MF) method 320 (e.g., alternating least squares (ALS), or the like) and a capturing short-term dynamics module 322. The capturing short-term dynamics module 322 may be used for capturing recent data usage patterns and filling in missing values in an interaction matrix, completing long-term preferences encoded in the embeddings.

The identifying relevant columns on user login module 324 includes a similar user identification 328, a column prediction 330, and a re-ranking with semantic embeddings 332. In various examples, when a first user logs into (or logs out of) the system, the intelligent data management system 104, in the similar user identification 328, calculates a cosine similarity score between an embedding of the first user and an embedding of a second user.

The intelligent data management system 104 may calculate a cosine similarity score between the first user and each user of a plurality of users of the system. The cosine similarity score may be weighted based on user role similarity and information from a leading user table, resulting in a ranked list of similar users.

In various examples, the intelligent data management system 104 uses the MF method to predict an interaction score (e.g., column prediction 330) for each table column of one or more table columns accessed by a user in a top position on the ranked list of similar users. In an example, the predicted interaction scores are aggregated across similar users and, optionally, weighted by similarity or role relevance.

In various examples, the intelligent data management system 104, in the identifying relevant columns on user login module 324, calculates a cosine similarity score between the embedding of the first user and an embedding of a table column. In an example, the one or more table columns are re-ranked based on their predicted interaction scores and the calculated cosine similarity scores (re-ranking with semantic embeddings 332); in that way, the ranking prioritizes semantically relevant columns with high predicted interaction potential.

In an example, the graph cube server 106 has a memory budget with a limit trigger. Once the memory budget reaches the limit trigger, the system may calculate a user-column affinity score 336 between one or more users of the system and one or more table columns to identify which table columns should be unloaded from memory to optimize for maximum memory utilization 338.

Figure 4:
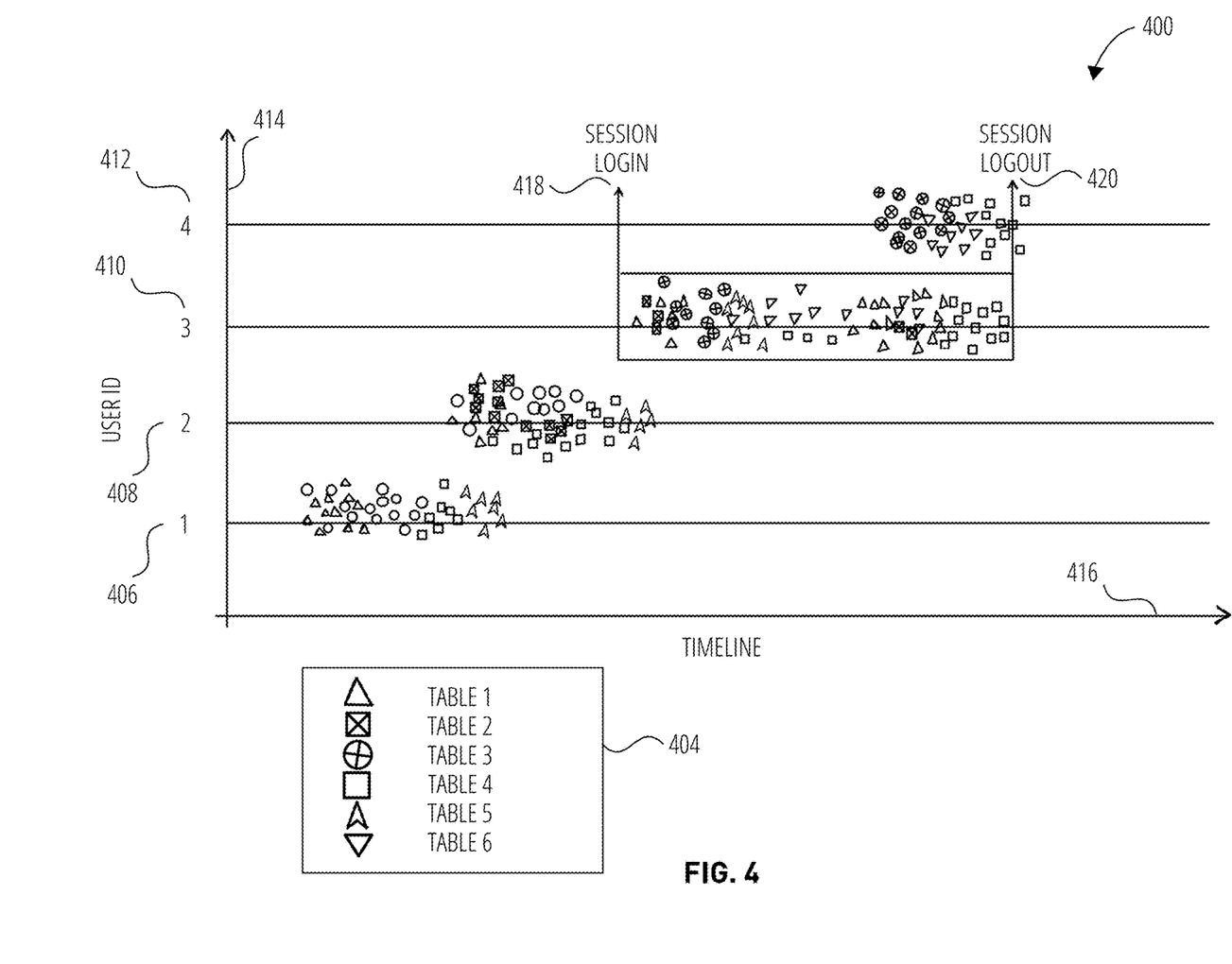
FIG. 4 is a diagram illustrating a scatter plot of table columns loaded into memory during user sessions of four different users, according to some examples.

FIG. 4 is a diagram illustrating a scatter plot 400 showing table columns loaded into memory during user sessions of four different users (a first user 406, a second user 408, a third user 410, and a fourth user 412), according to some examples. In an example, the system includes columns across six different tables (legend 404), and the four users are accessing these columns based on their user roles. Each user role of a plurality of user roles includes an access control list (ACL) to the tables. The ACL are rules on how a user can interact with the system based on the one or more roles of the user and which tables (or columns) the user can access (i.e., which tables (or columns) can be loaded into memory).

In an example, a user of the system may have one or more user roles. The first user 406, the second user 408, the third user 410, and the fourth user 412 have at least one user role in common. The scatter plot 400 includes a user ID y-axis 414 and a timeline x-axis 416. The scatter plot 400 shows a user session including a session login 418 and a session logout 420. In scatter plot 400, at the beginning of a user session (e.g., 418), generally, table 1 is accessed and table 4 is not. In scatter plot 400, no user accesses table 6 before accessing table 3.

In an example, the intelligent data management system 104, using the scatter plot 400 information, make some inferences to decide which tables to load into memory. When a user logs into the system, the intelligent data management system 104 may load table 1 upfront based on the scatter plot 400. Based on scatter plot 400, the intelligent data management system 104 may load table 6 along with table 3 so that subsequent usages of table 6 are faster. The intelligent data management system 104 may unload table 1 of the memory after inactivity of any of the columns of table 1.

Figure 5:
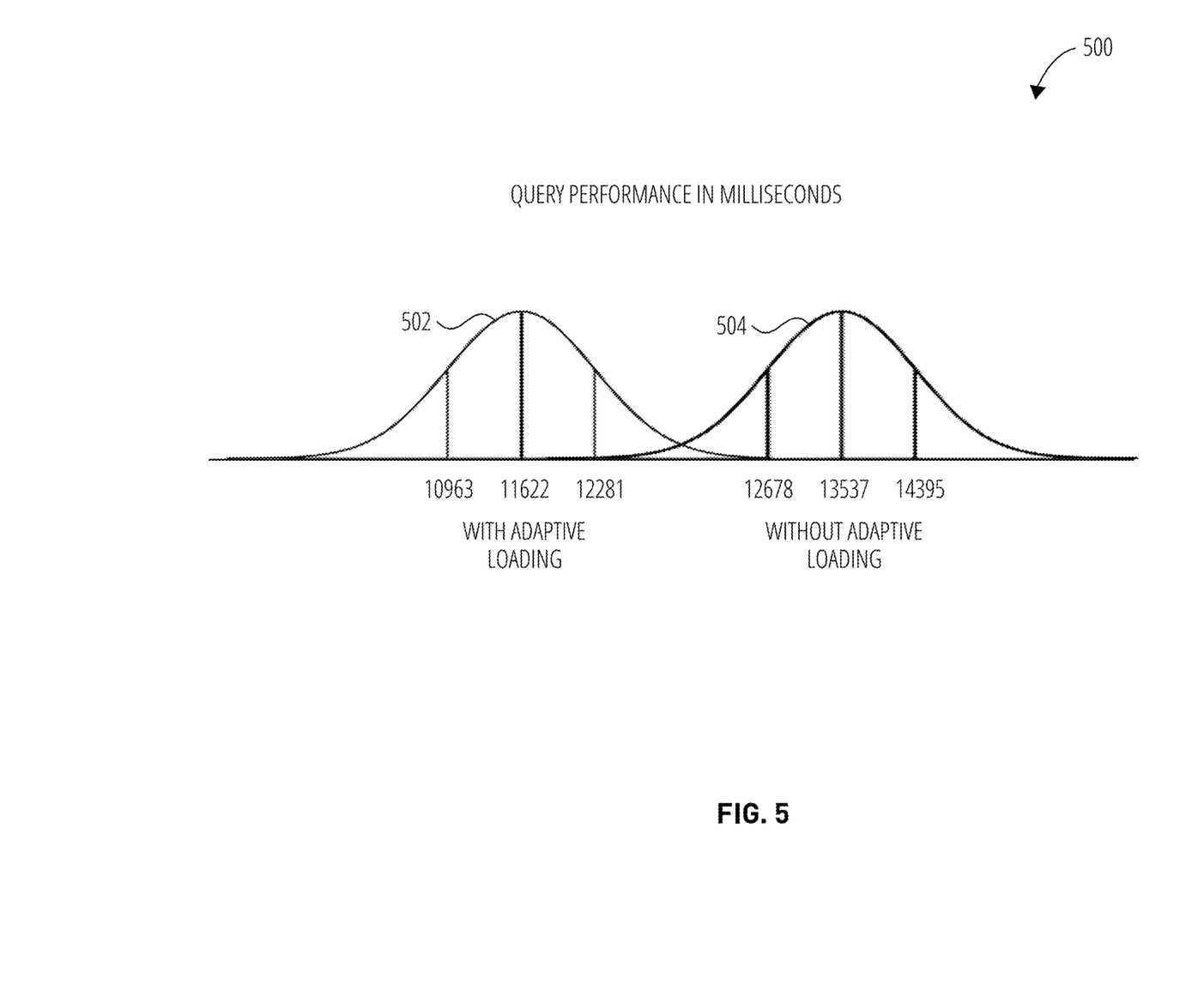
FIG. 5 is a diagram illustrating a comparison of model performance graphs.

FIG. 5 is a diagram 500 illustrating an example of comparative performance in loading a report (e.g., with a dataset of 60 million rows or the like) between a system with adaptative loading 502 and a system without adaptative loading 504. In an example, the users have certain roles that define the category of users. The system may incorporate user-based collaborative filtering in which recommendations may be made based on preferences of users similar to a target user. In an example, similarness is based on roles assigned to the users.

Figure 6:
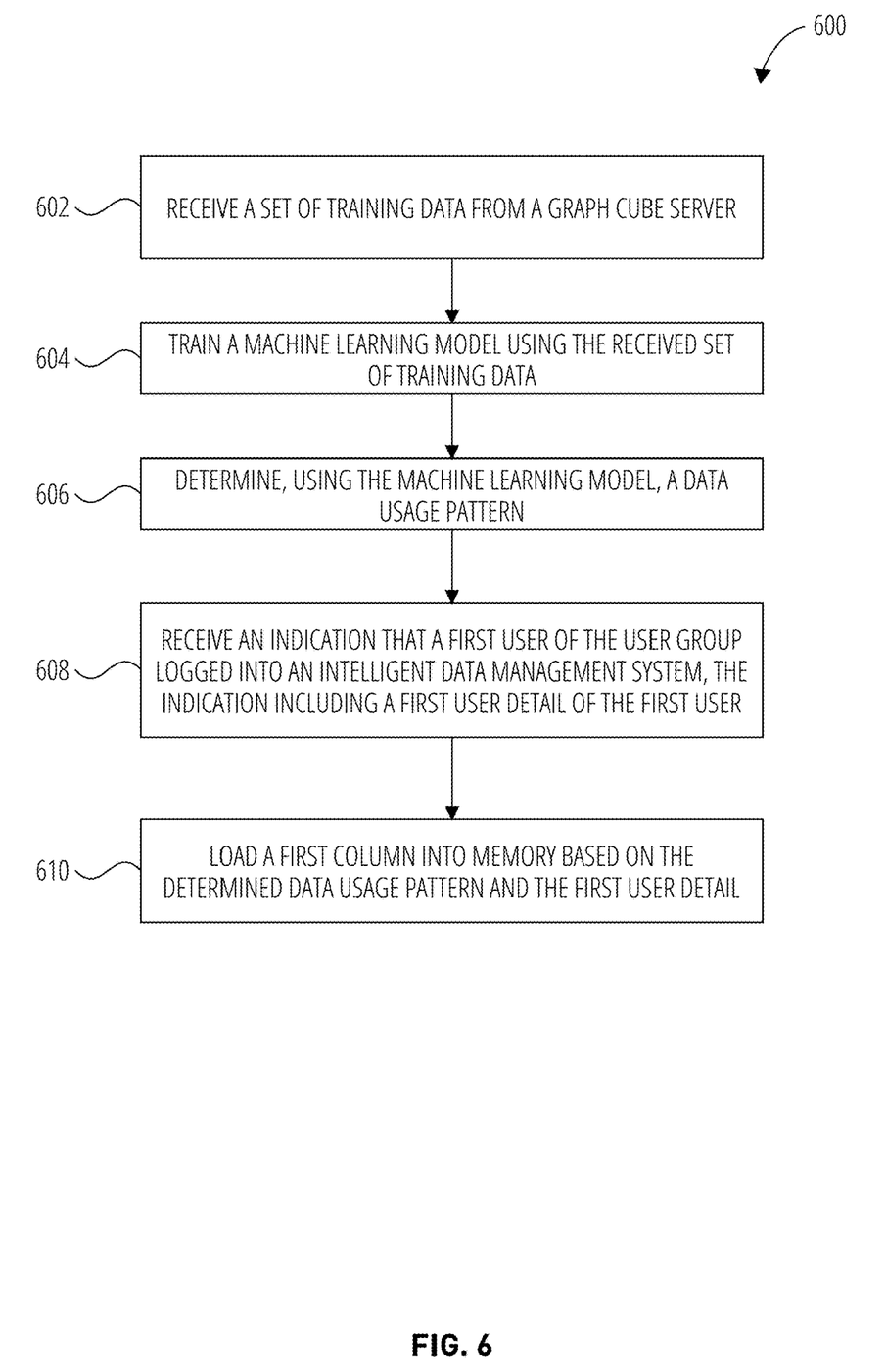
FIG. 6 is a flowchart illustrating a technique for intelligent data management, in accordance with some examples.

FIG. 6 is a flowchart illustrating technique 600 for intelligent data management, according to various examples. The technique 600 may provide features as described in FIG. 1 through FIG. 4. In an example, operations of technique 600 may be performed by processing circuitry, for example by executing instructions stored in memory. The processing circuitry may include a processor, a system on a chip, or other circuitry (e.g., wiring). For example, technique 600 may be performed by processing circuitry of a device (or one or more hardware or software components thereof), such as those illustrated and described with reference to FIG. 8.

The technique 600 includes an operation 602 to receive a set of training data from a graph cube server. In an example, the set of training data includes access historical data of one or more user groups. In various examples, the graph cube server includes an in-memory columnar database.

The technique 600 includes an operation 604 to trains a machine learning model using the received set of training data.

The technique 600 includes an operation 606 to determine, using the machine learning model, a data usage pattern.

The technique 600 includes an operation 608 to receive an indication that a first user of the user group logged into an intelligent data management system. In an example, the indication includes a first user detail of the first user. In an example, the first user detail includes at least one of a user identification (ID) or a user group of the one or more user groups. The first user detail may include one or more user roles, each user role of the one or more user roles having an access control list (ACL).

The technique 600 includes an operation 610 to load a first column into memory based on the determined data usage pattern and the first user detail.

In various examples, the technique 600 includes an operation to receive an indication that the first user logged out of the intelligent data management system. In an example, the technique 600 includes an operation to unload a second column based on the determined data usage pattern, the first user detail, and a second user detail of a second user, wherein the second user is logged into the intelligent data management system.

In various examples, the technique 600 includes an operation to receive a second set of training data from the graph cube server, retrain the machine learning model using the second set of training data, and determine, using the machine learning model, an updated data usage pattern.

Figure 7:
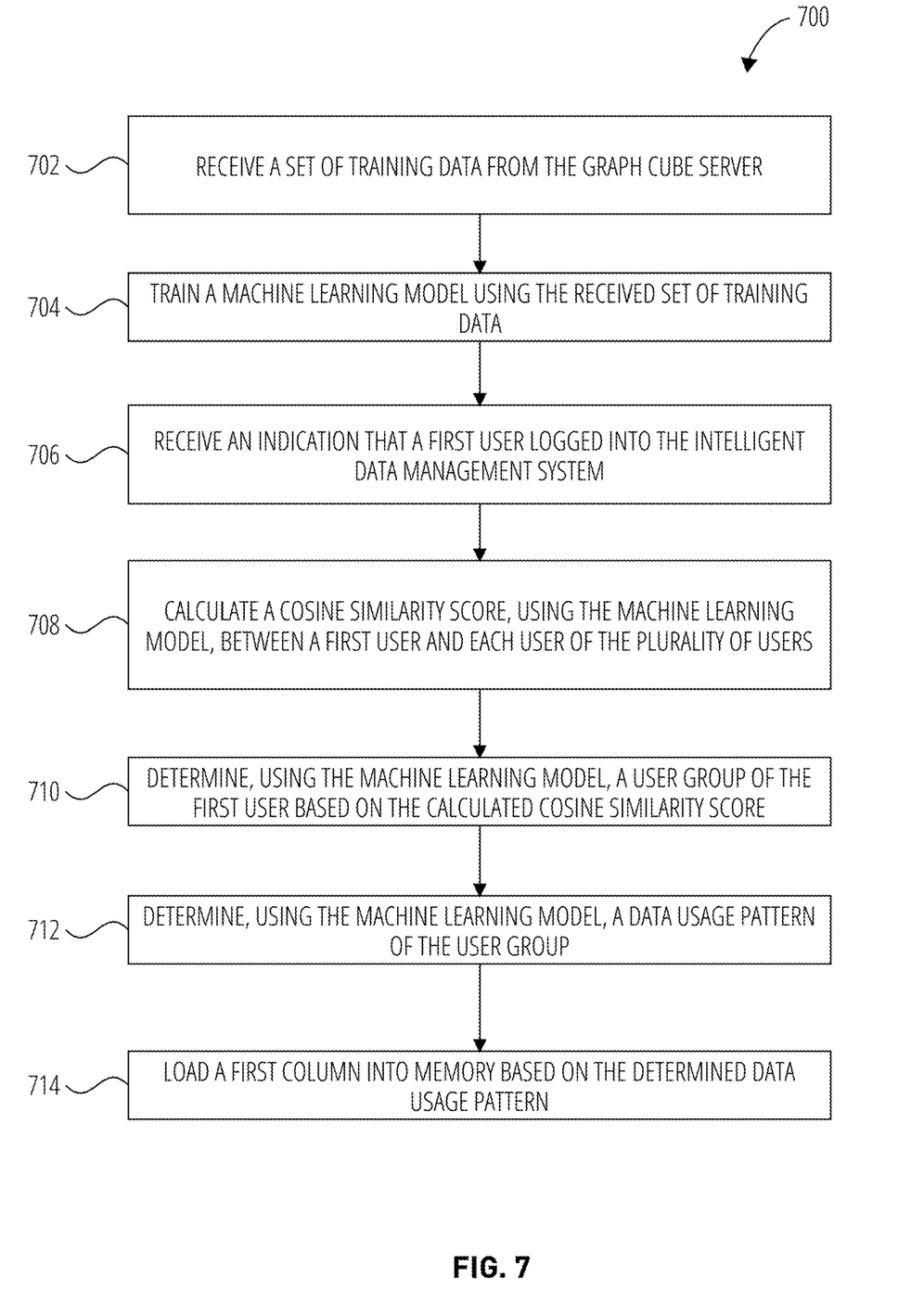
FIG. 7 is a flowchart illustrating a technique for intelligent data management, in accordance with some examples.

FIG. 7 is a flowchart illustrating technique 700 for intelligent data management, according to various examples. The technique 700 may provide features as described in FIG. 1 through FIG. 4. In an example, operations of technique 700 may be performed by processing circuitry, for example by executing instructions stored in memory. The processing circuitry may include a processor, a system on a chip, or other circuitry (e.g., wiring). For example, technique 700 may be performed by processing circuitry of a device (or one or more hardware or software components thereof), such as those illustrated and described with reference to FIG. 8.

Technique 700 includes an operation 702 to receive a set of training data from the graph cube server. In an example, the set of training data includes access historical data and user details of a plurality of users. In an example, the graph cube server includes an in-memory columnar database. In an example, the access historical data includes an M×N matrix, wherein M represents a number of users and N represents a number of system columns.

Technique 700 includes an operation 704 to train a machine learning model using the received set of training data.

In operation 706, technique 700 receives an indication that a first user logged into the intelligent data management system. In an example, the indication includes a first user detail of the first user. In an example, the first user detail includes a user identification (ID). In an example, the first user detail includes one or more user roles, each user role of the one or more user roles having an access control list (ACL). In various examples, the one or more user roles includes at least one of a forecast planner, a forecast overrider, a system architect, a data administrator, or a planner.

In operation 708, technique 700 calculates a cosine similarity score, using the machine learning model, between a first user and each user of the plurality of users. In an example, the calculation of the cosine similarity score is based on the first user detail and the user details of the plurality of users.

Technique 700 includes an operation 710 to determine, using the machine learning model, a user group of the first user based on the calculated cosine similarity score.

Technique 700 includes an operation 712 to determine, using the machine learning model, a data usage pattern of the user group.

Technique 700 includes an operation 714 to load a first column into memory based on the determined data usage pattern.

Technique 700 may include an operation to receive an indication that the first user logged out of the intelligent data management system and unload a second column based on the determined data usage pattern, the first user detail, and a second user detail of a second user, wherein the second user is logged into the intelligent data management system.

The technique 700 may include an operation to receive a second set of training data from the graph cube server, retrain the machine learning model using the second set of training data and determine, using the machine learning model, an updated data usage pattern.

Figure 8:
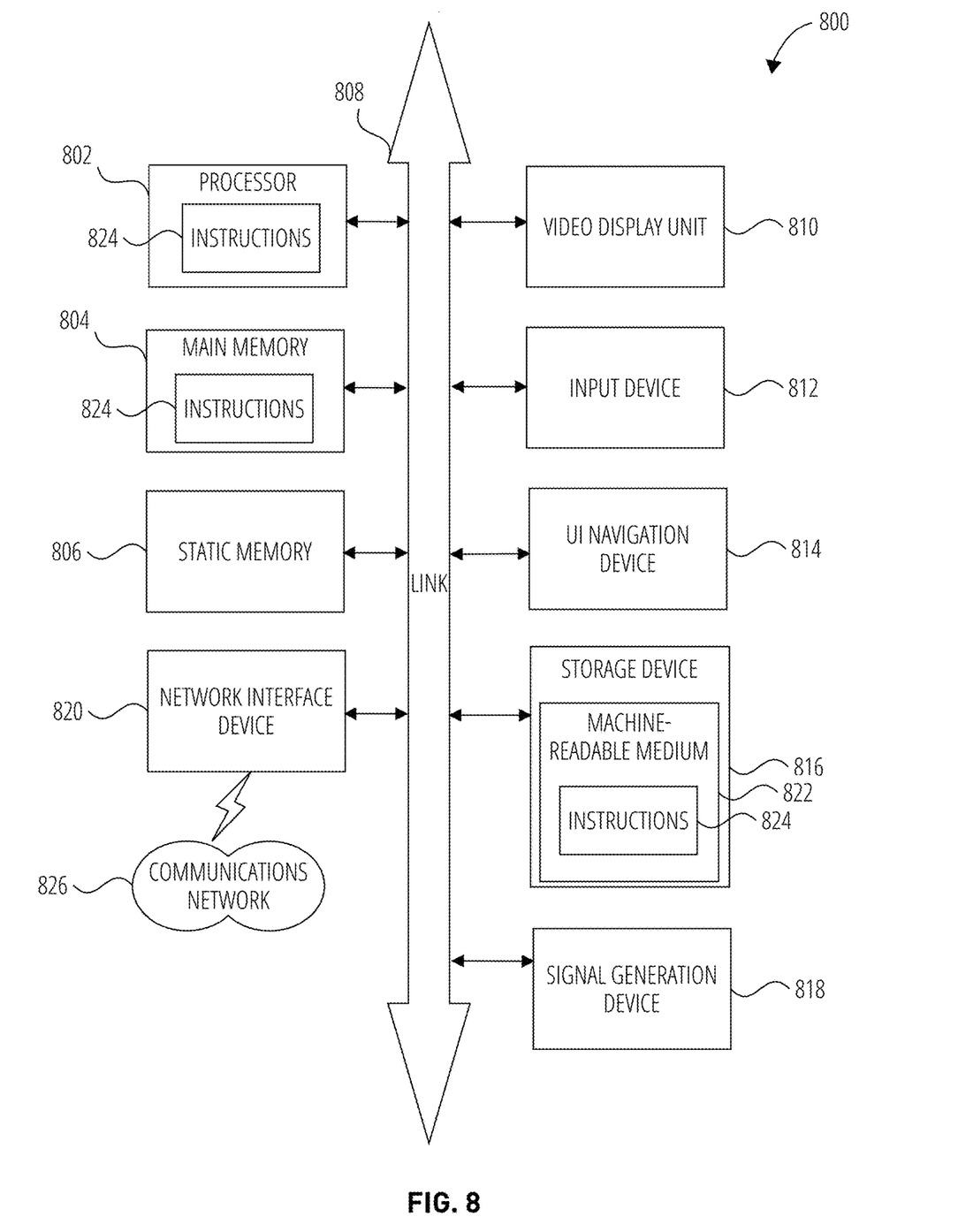
FIG. 8 illustrates generally an example of a block diagram of a machine upon which any one or more of the techniques discussed herein may perform in accordance with some examples.

FIG. 8 is a block diagram illustrating a machine in the example form of computer system 800, within which a set or sequence of instructions may be executed to cause the machine to perform any one of the methodologies discussed herein, according to an example. In alternative examples, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, or the like), a main memory 804, and a static memory 806, which communicate with each other via a link 808. The computer system 800 may further include a video display unit 810, an input device 812 (e.g., a keyboard), and a user interface (UI) navigation device 614 (e.g., a mouse). In one example, the video display unit 810, input device 812, and UI navigation device 814 are incorporated into a single device housing such as a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensors.

The storage device 816 includes a machine-readable medium 822 which stores one or more sets of data structures and instructions 824 (e.g., software) embodying or utilized by any one or more of the methodologies or functions described herein. The instructions 824 may also reside, completely or at least partially, within the main memory 804, the static memory 806, and/or within the processor 802 during execution thereof by the computer system 800, with the main memory 804, the static memory 806, and the processor 802 also constituting machine-readable media.

While the machine-readable medium 822 is illustrated in an example to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding, or carrying instructions for execution by the machine and that causes the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 822 that excludes transitory signals.

The instructions 824 may further be transmitted or received over a communications network 826 using a transmission medium via the network interface device 820 utilizing any one of a number of well-known transfer protocols (e.g., HTTP). Examples of communication networks include a Local Area Network (LAN), a Wide Area Network (WAN), the Internet, mobile telephone networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Each of these non-limiting examples may stand on its own or may be combined in various permutations or combinations with one or more of the other examples.

Example 1 is an intelligent data management system in communication with a graph cube server, the intelligent data management system comprising: an in-built database; processing circuitry; and memory including instructions that, when executed by the processing circuitry, cause the processing circuitry to perform operations to: receive a set of training data from the graph cube server, the set of training data including access historical data and user details of a plurality of users; train a machine learning model using the received set of training data; receive an indication that a first user logged into the intelligent data management system, the indication including a first user detail of the first user; calculate a cosine similarity score, using the machine learning model, between a first user and each user of the plurality of users based on the first user detail and the user details of the plurality of users; determine, using the machine learning model, a user group of the first user based on the calculated cosine similarity score; determine, using the machine learning model, a data usage pattern of the user group; and load a first column into memory based on the determined data usage pattern.

In Example 2, the subject matter of Example 1 includes, wherein the graph cube server includes an in-memory columnar database.

In Example 3, the subject matter of Examples 1-2 includes, wherein the instructions, when executed, further cause the processing circuitry to, receive an indication that the first user logged out of the intelligent data management system; and unload a second column based on the determined data usage pattern, the first user detail, and a second user detail of a second user, wherein the second user is logged into the intelligent data management system.

In Example 4, the subject matter of Examples 1-3 includes, wherein the instructions, when executed, further cause the processing circuitry to, receive a second set of training data from the graph cube server; retrain the machine learning model using the second set of training data; and determine, using the machine learning model, an updated data usage pattern.

In Example 5, the subject matter of Examples 1-4 includes, wherein the access historical data includes an M×N matrix, wherein M represents a number of users and N represents a number of system columns.

In Example 6, the subject matter of Examples 1-5 includes, wherein the first user detail includes a user identification (ID).

In Example 7, the subject matter of Examples 1-6 includes, wherein the first user detail includes one or more user roles, each user role of the one or more user roles having an access control list (ACL).

In Example 8, the subject matter of Example 7 includes, wherein the one or more user roles includes at least one of a forecast planner, a forecast overrider, a system architect, a data administrator, or a planner.

Example 9 is at least one non-transitory machine-readable medium including instructions, which when executed by processing circuitry, cause the processing circuitry to perform operations to: receive a set of training data from a graph cube server, the set of training data including access historical data of one or more user groups; train a machine learning model using the received set of training data; determine, using the machine learning model, a data usage pattern; receive an indication that a first user of a first user group of the one or more user groups logged into an intelligent data management system, the indication including a first user detail of the first user; and load a first column into memory based on the determined data usage pattern and the first user detail.

In Example 10, the subject matter of Example 9 includes, wherein the graph cube server includes an in-memory columnar database.

In Example 11, the subject matter of Examples 9-10 includes, instructions that, when executed by the processing circuitry, cause the processing circuitry to perform operations to: receive an indication that the first user logged out of the intelligent data management system; and unload a second column based on the determined data usage pattern, the first user detail, and a second user detail of a second user, wherein the second user is logged into the intelligent data management system.

In Example 12, the subject matter of Examples 9-11 includes, instructions that, when executed by the processing circuitry, cause the processing circuitry to perform operations to: receive a second set of training data from the graph cube server; retrain the machine learning model using the second set of training data; and determine, using the machine learning model, an updated data usage pattern.

In Example 13, the subject matter of Examples 9-12 includes, wherein the first user detail includes at least one of a user identification (ID) or a user group of the one or more user groups.

In Example 14, the subject matter of Examples 9-13 includes, wherein the first user detail includes one or more user roles, each user role of the one or more user roles having an access control list (ACL).

Example 15 is a method for intelligent data management, the method comprising: receiving a set of training data from a graph cube server, the set of training data including access historical data of one or more user groups; training a machine learning model using the received set of training data; determining, using the machine learning model, a data usage pattern; receiving an indication that a first user of a first user group of the one or more user groups logged into an intelligent data management system, the indication including a first user detail of the first user; and loading a first column into memory based on the determined data usage pattern and the first user detail.

In Example 16, the subject matter of Example 15 includes, wherein the graph cube server includes an in-memory columnar database.

In Example 17, the subject matter of Examples 15-16 includes, receiving an indication that the first user logged out of the intelligent data management system; and unloading a second column based on the determined data usage pattern, the first user detail, and a second user detail of a second user, wherein the second user is logged into the intelligent data management system.

In Example 18, the subject matter of Examples 15-17 includes, receiving a second set of training data from the graph cube server; retraining the machine learning model using the second set of training data; and determining, using the machine learning model, an updated data usage pattern.

In Example 19, the subject matter of Examples 15-18 includes, wherein the first user detail includes at least one of a user identification (ID) or a user group of the one or more user groups.

In Example 20, the subject matter of Examples 15-19 includes, wherein the first user detail includes one or more user roles, each user role of the one or more user roles having an access control list (ACL).

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include but are not limited to, hard disks, removable magnetic disks, removable optical disks (e.g., compact disks and digital video disks), magnetic cassettes, memory cards or sticks, random access memories (RAMs), read-only memories (ROMs), and the like.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other examples may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description, with each claim standing on its own as a separate example. The scope of the examples should be determined with reference to the appended claims, along with the full scope of equivalents to which such claims are entitled.

What is claimed is:

1. An intelligent data management system in communication with a graph cube server, the intelligent data management system comprising:
   an in-built database;
   processing circuitry; and
   memory including instructions that, when executed by the processing circuitry, cause the processing circuitry to perform operations to:
      receive a set of training data from the graph cube server, the set of training data including access historical data and user details of a plurality of users, wherein the graph cube server includes an in-memory columnar database;
      train a machine learning model using the received set of training data, wherein the training uses a machine learning algorithm to produce the machine learning model as a prediction model based on features associated with the set of training data and feedback associated with those features;
      determine, using the machine learning model, a data usage pattern;
      receive an indication that a first user logged into the intelligent data management system, the indication including a first user detail of the first user;
      calculate a cosine similarity score, using the machine learning model, between a first user and each user of the plurality of users based on the first user detail and the user details of the plurality of users;
      determine, using the machine learning model, a ranked list of similar users to the first user based on the calculated cosine similarity score;
      determine, using the machine learning model, an aggregated interaction score for each column of one or more columns, the aggregated interaction score based on interaction scores for each top user of the ranked list of similar users;
      load a first column into memory based on the determined data usage pattern;
      receive an indication that the first user logged out of the intelligent data management system;
      upon access of the intelligent data management system by a second user, unload a second column based on the determined data usage pattern, the first user detail, and a second user detail of the second user, wherein the second user is logged into the intelligent data management system; and
      update the prediction model periodically via subsequent additional training using additional feedback.

2. The intelligent data management system of claim 1, wherein the instructions, when executed, further cause the processing circuitry to,
   receive a second set of training data from the graph cube server;
   retrain the machine learning model using the second set of training data; and
   determine, using the machine learning model, an updated data usage pattern.

3. The intelligent data management system of claim 1, wherein the access historical data includes an M×N matrix, wherein M represents a number of users and N represents a number of system columns.

4. The intelligent data management system of claim 1, wherein the first user detail includes a user identification (ID).

5. The intelligent data management system of claim 1, wherein the first user detail includes one or more user roles, each user role of the one or more user roles having an access control list (ACL).

6. The intelligent data management system of claim 5, wherein the one or more user roles includes at least one of a forecast planner, a forecast overrider, a system architect, a data administrator, or a planner.

7. At least one non-transitory machine-readable medium including instructions, which when executed by processing circuitry, cause the processing circuitry to perform operations to:
   receive a set of training data from a graph cube server, the set of training data including access historical data of one or more user groups, wherein the graph cube server includes an in-memory columnar database;
   train a machine learning model using the received set of training data, wherein the training uses a machine learning algorithm to produce the machine learning model as a prediction model based on features associated with the set of training data and feedback associated with those features;
   determine, using the machine learning model, a data usage pattern;
   receive an indication that a first user of a first user group of the one or more user groups logged into an intelligent data management system, the indication including a first user detail of the first user;
   calculate a cosine similarity score, using the machine learning model, between a first user and each user of the one or more user groups based on the first user detail and group details of the one or more user groups;
   determine, using the machine learning model, a ranked list of similar users to the first user based on the calculated cosine similarity score;
   determine, using the machine learning model, an aggregated interaction score for each column of one or more columns, the aggregated interaction score based on interaction scores for each top user of the ranked list of similar users;
   load a first column into memory based on the determined data usage pattern and the first user detail;
   receive an indication that the first user logged out of the intelligent data management system;
   upon access of the intelligent data management system by a second user, unload a second column based on the determined data usage pattern, the first user detail, and a second user detail of the second user, wherein the second user is logged into the intelligent data management system; and update the prediction model periodically via subsequent additional training using additional feedback.

8. The at least one non-transitory machine-readable medium of claim 7, further comprising instructions that, when executed by the processing circuitry, cause the processing circuitry to perform operations to:

receive a second set of training data from the graph cube server;

retrain the machine learning model using the second set of training data; and determine, using the machine learning model, an updated data usage pattern.

9. The at least one non-transitory machine-readable medium of claim 7, wherein the first user detail includes at least one of a user identification (ID) or a user group of the one or more user groups.

10. The at least one non-transitory machine-readable medium of claim 7, wherein the first user detail includes one or more user roles, each user role of the one or more user roles having an access control list (ACL).

11. A method for intelligent data management, the method comprising:

receiving a set of training data from a graph cube server, the set of training data including access historical data of one or more user groups, wherein the graph cube server includes an in-memory columnar database;

training a machine learning model using the received set of training data, wherein the training uses a machine learning algorithm to produce the machine learning model as a prediction model based on features associated with the set of training data and feedback associated with those features;

determining, using the machine learning model, a data usage pattern;

receiving an indication that a first user of a first user group of the one or more user groups logged into an intelligent data management system, the indication including a first user detail of the first user;

calculating a cosine similarity score, using the machine learning model, between a first user and each user of the one or more user groups based on the first user detail and group details of the one or more user groups;

determining, using the machine learning model, a ranked list of similar users to the first user based on the calculated cosine similarity score;

determining, using the machine learning model, an aggregated interaction score for each column of one or more columns, the aggregated interaction score based on interaction scores for each top user of the ranked list of similar users;

loading a first column into memory based on the determined data usage pattern and the first user detail;

receiving an indication that the first user logged out of the intelligent data management system;

upon accessing the intelligent data management system by a second user, unloading a second column based on the determined data usage pattern, the first user detail, and a second user detail of the second user, wherein the second user is logged into the intelligent data management system; and updating the prediction model periodically via subsequent additional training using additional feedback.

12. The method of claim 11, further comprising:

receiving a second set of training data from the graph cube server;

retraining the machine learning model using the second set of training data; and determining, using the machine learning model, an updated data usage pattern.

13. The method of claim 11, wherein the first user detail includes at least one of a user identification (ID) or a user group of the one or more user groups.

14. The method of claim 11, wherein the first user detail includes one or more user roles, each user role of the one or more user roles having an access control list (ACL).

* * * * *